No. 871,960. PATENTED NOV. 26, 1907.
W. W. SALMON.
SIGNALING SYSTEM.
APPLICATION FILED AUG. 29, 1905.
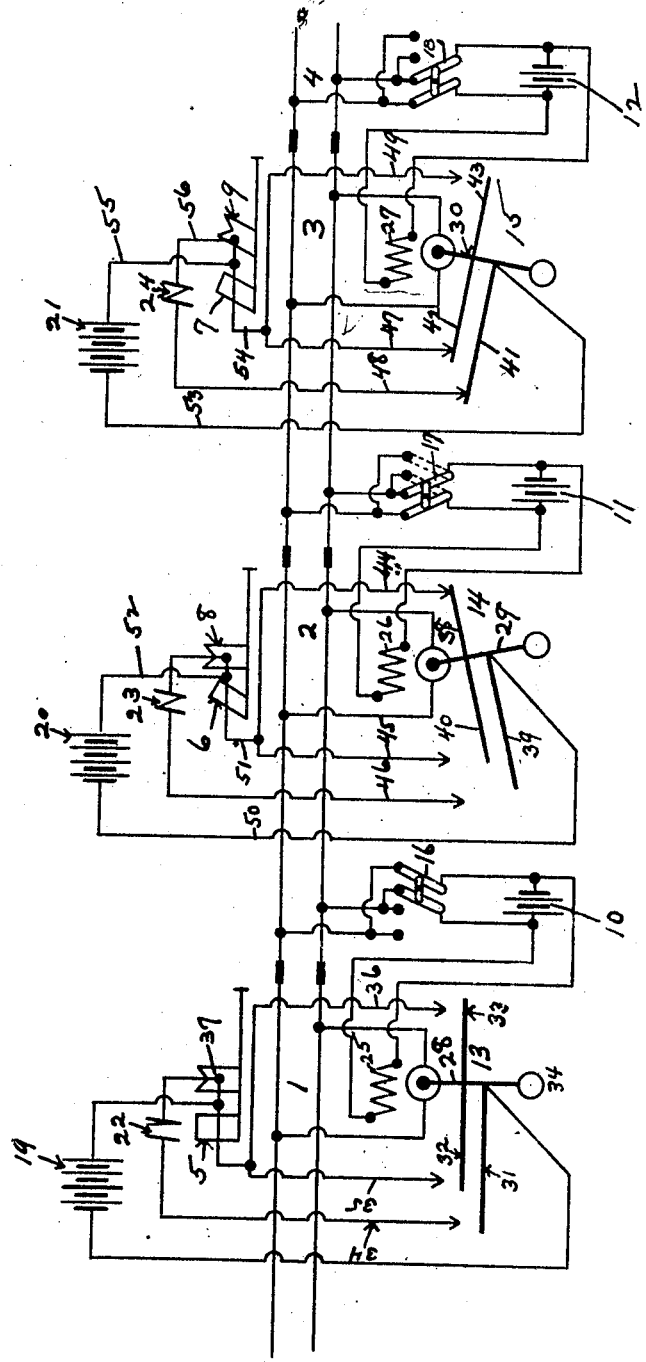
WITNESSES
INVENTOR: Wilmer W. Salmon
BY Macomber & Ellis
ATTORNEYS

UNITED STATES PATENT OFFICE.

WILMER W. SALMON, OF BUFFALO, NEW YORK.

SIGNALING SYSTEM.

No. 871,960.  Specification of Letters Patent.  Patented Nov. 26, 1907.

Application filed August 29, 1905. Serial No. 276,270.

*To all whom it may concern:*

Be it known that I, WILMER W. SALMON, a citizen of the United States, residing at Buffalo, in the county of Erie and State of New York, have invented new and useful Improvements in Signaling Systems, of which the following is a specification.

My invention relates to signaling systems and more particularly to block signaling systems.

My chief object has been to provide a method or means of operating distant signals without the use of line wires.

The accompanying drawing consisting of one sheet, gives a diagrammatic representation of my invention and the circuits employed to carry it out.

1, 2, 3 and 4 represent track circuit sections.

5, 6, and 7 are the home signals for the sections 1, 2 and 3 respectively.

8 is the distant signal for the home signal 5, and 9 is the distant signal for the home signal 6.

10, 11 and 12 are the track batteries for the sections 1, 2, and 3 respectively.

13, 14 and 15 are the track relays for the sections 1, 2 and 3 respectively.

16, 17 and 18 are current changing devices operated by the home signals 5, 6 and 7 respectively.

19, 20 and 21 are signal operating batteries for the respective circuits.

22, 23 and 24 are circuit closers which are operated by the home signals as hereinafter described.

The relays herein shown and described, are constructed on the well known principle of those electric motors which have stationary fields and revolving armatures. Thus 25, 26 and 27 are the stationary fields and 28, 29 and 30 are the revolving armatures of the relays 13, 14 and 15 respectively. As shown herein the windings of the revolving armatures are connected to the track while each stationary field is supplied with current from the track battery in the track circuit section next adjoining that of the field. These fields may however, be connected with any convenient source of energy.

The armature 28 carries three contact makers 31, 32 and 33 and a weight 34 which, when there is no current passing through the winding of the armature, tends to keep the contact makers in a horizontal or non-contact making position.

It is well known in the art that the direction of rotation of an armature of a motor depends on the relative direction of the current passing through the field and the armature. In my invention the current always flows in the same direction through the field and I provide means for changing the direction of the current through the armature.

The armature of each of the relays in my invention has when subjected to different conditions, three distinct positions. Thus referring to the armature 28 of the relay 13: When there is no current flowing through the windings of the armature, the contact makers 31, 32 and 33 under the influence of the weight 34 assume a horizontal or non-contact making position. When the current flows in one direction through the armature, it is rotated so that the contact makers 31 and 32 make contact with the wires 34 and 35 respectively and when the direction of the current through the armature is reversed, it is rotated in the opposite direction so that the contact maker 33 makes contact with wire 36.

In the accompanying diagram the parts are shown in the positions which they assume when a train is in the track circuit section 1—that is, no current is passing through the windings of the armature 28 of the relay 13 and the contact makers 31, 32 and 33 assume non-contact making positions. The home signal 5 and the distant signal 37 are at the "stop" position it being assumed that there is no train in the track circuit section 2. The home signal 6 is in the "proceed" position and the distant signal 8 in the "stop" position corresponding to the home signal 5. The armature 29 of the relay 14 is receiving current from the battery 10 through the current changer 16 in such a direction that it is rotated so that the contact maker 38 makes contact with the wire 44.

No signal operating mechanism is shown but any well known electrically controlled mechanism may be employed therefor, provided it places and holds the semaphore blade in the "proceed" position when actuated by the current flowing through the circuit composed of the following elements: battery 20, wire 50, armature 29 of the relay 14, contact maker 38 and wires 44 and 51, home signal 6 and wire 52 back to battery 20. The track circuit section 3 being also unoccupied by a train the armature 30 of the relay 15 receives current from the battery 11 through the current changer 17 in such a direction that it is rotated so that the contact makers 41 and 42 make contact with the wires 48 and 47 respectively. This completes a circuit which includes the signal operating mechanism for the home signal 7 and consists of the following elements: battery 21, wire 53, armature 30 of the relay 15, contact maker 42, wire 47, wire 54, home signal 7 and wire 55 back to battery 21. This current moves and holds the home signal 7 in a "proceed" position. The contact maker 41 by coming in contact with wire 48 at the same time makes a circuit which includes the following elements: Battery 21, wire 53, armature 30 of the relay 15, contact maker 41, wire 48, circuit closer 24, wire 56, distant signal 9 and wire 55 back to battery 21. This current moves and holds the distant signal to a "proceed" position.

Having thus described the several parts of my invention and their relative positions I will now describe the method of their operation: I will assume that all the signals shown in the accompanying diagram are standing in a "proceed" position and that a train is passing from right to left. As the train passes into the track circuit section 3 it shunts the current from the relay 15 and the armature assumes a neutral or non-contact making position thus breaking the currents which hold the home signal 7 and the distant signal 9 in the "proceed" position and each of said signals assumes a "stop" position. As the train passes into the track circuit section 2 the home signal 6 and the distant signal 8 assume the "stop" position because current is shunted from the relay 14. As the home signal 6 goes to the "stop" position, the current changer 17 assumes the position shown in the dotted lines or the position that would send current through the windings of the armature 30 of the relay 15 in such a direction that it would rotate towards the right and the contact maker 43 would make contact with the wire 49. This would complete a circuit through the operating mechanism of the home signal 7 which would include the following elements: battery 21, wire 53, armature 30 of the relay 15, contact maker 43, wire 49, wire 54, home signal 7 and wire 55 back to battery. This would cause the home signal 7 to assume a "proceed" position. As the train passes into the track circuit section 1, current would be shunted from the relay 13 and the home signal 5 and distant signal 37 would therefore assume the "stop" position. The armature 29 of the relay 14 would then receive current from the battery 10 through the current changer 16 in such a direction that it would rotate towards the right so that contact maker 38 would make contact with the wire 44. This would complete circuit through the operating mechanism of the home signal 6 which would include the following elements: battery 20, wire 50, armature 29 of the relay 14, contact maker 38, wires 44 and 51, home signal 6 and wire 52 back to battery 20. This would cause the home signal to assume a "proceed" position and at the same time the current changer 17 would be shunted to the position shown in full lines or in the position to send current through the armature 30 of the relay 15 in such a direction as to rotate it so that contact makers 41 and 42 will make contact with wires 48 and 47 respectively. As heretofore described, this new position of the contact makers 41 and 42 will establish currents that will cause the home signal 7 and the distant signal 9 to assume the "proceed" position.

While we have shown batteries as the source of energy for the track relays, it is apparent that some other suitable source of energy may be employed instead, such as line wires supplied from a dynamo which conduct either an alternating or a direct current.

It will be evident to those skilled in the art that my invention is as readily adaptable for use with a three position signal which governs a single track circuit section or two of such sections as it is for the uses and purposes herein described.

Having thus described my invention, what I claim is:

1. In a block signal system, the combination with track circuit sections and signals for such sections, of a source of direct current energy connected at one end of each of said sections, a relay connected at the other end of each of said sections comprising a stationary field connected across the source of direct current energy of the next adjacent section, and a rotating armature connected across the source of direct current energy of the section in which it is included and capable of three functional positions, means for controlling the functional positions of said armature, means for controlling one of said signals by one of said functional positions of said armature, and means for controlling two of said signals by another functional position of said armature.

2. In a block signal system, the combination with insulated track circuit sections and signals for such sections, of a source of energy connected to one end of each of said sections, means located at one end of each of said sections for creating a difference of potential between the rails thereof, a relay connected at the other end of each of said sections comprising a member energized by the difference of potential between the rails of the next adjacent section, and a rotating member energized by the difference of potential between the rails of the section in which it is included and capable of three functional positions, means for controlling said functional positions, means for operating one of said signals to the "proceed" position by one of said functional positions of said armature, means for operating two of said signals to the "proceed" position by another functional position of said armature, and means for operating both of said signals to the "stop" position by the third functional position of said armature.

In testimony whereof, I have hereunto subscribed my name in the presence of two witnesses.

WILMER W. SALMON.

Witnesses:
A. J. BELFRY,
J. F. BRAAM.